May 12, 1970 T. PFAU 3,511,475
VALVE ASSEMBLY
Filed Nov. 22, 1967 2 Sheets-Sheet 1
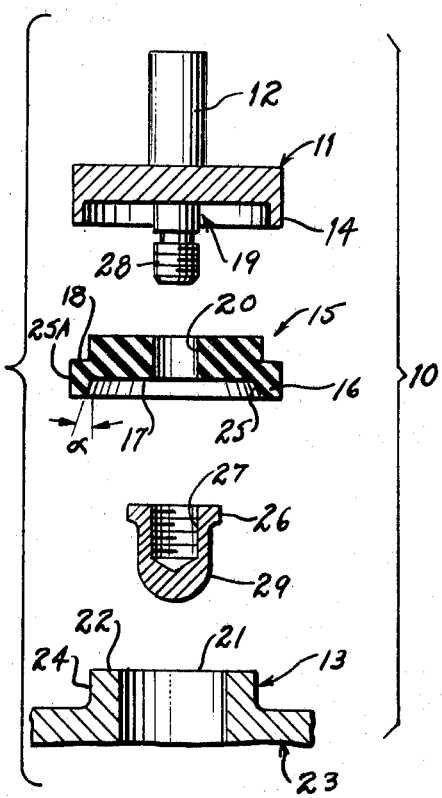
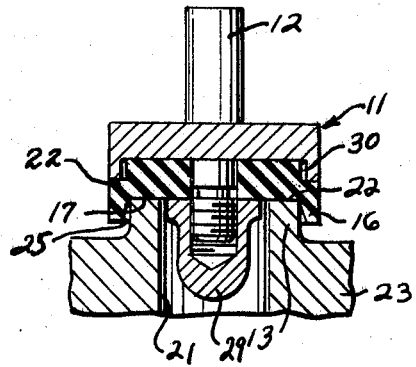
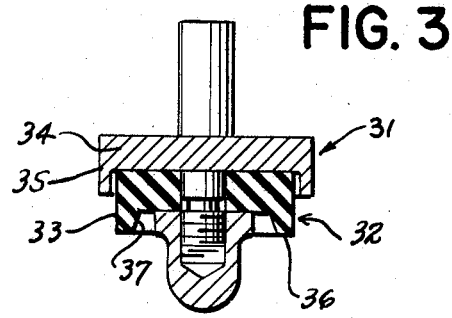
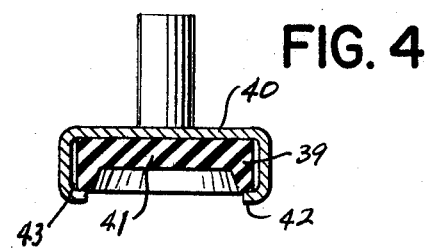
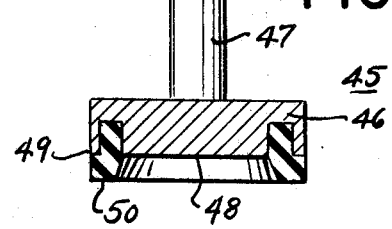
INVENTOR
THOMAS PFAU
BY
*Pennie, Edmonds, Morton, Taylor & Adams*
ATTORNEYS May 12, 1970     T. PFAU     3,511,475

VALVE ASSEMBLY

Filed Nov. 22, 1967     2 Sheets-Sheet 2

INVENTOR
THOMAS PFAU

BY
*Pennie, Edmonds, Morton, Taylor & Adams*
ATTORNEYS

United States Patent Office 3,511,475
Patented May 12, 1970

3,511,475
VALVE ASSEMBLY
Thomas Pfau, Aargau, Switzerland, assignor to Aktiengellschaft Oederlin & Cie, Baden, Switzerland
Filed Nov. 22, 1967, Ser. No. 685,191
Claims priority, application Switzerland, Nov. 25, 1966, 16,935/66; June 21, 1967, 8,820/67
Int. Cl. F16k 25/00
U.S. Cl. 251—333                              7 Claims

ABSTRACT OF THE DISCLOSURE

A sealing element with a bead in the form of a projecting rim extending away from a sealing surface of the element is used to provide a special sealing arrangement for a valve assembly having a protruding annular valve seat. The bead has (a) an inner circumferential surface which may be slightly beveled for gripping the outer peripheral surface of the protruding valve seat structure when the sealing surface is in abutment with the frontal surface of the protruding valve seat, and (b) an outer circumferential surface free to expand away from the peripheral surface of the protruding valve seat for a distance corresponding to the thermal expansion characteristic of the bead.

BACKGROUND OF THE INVENTION

Field of the invention

This invention relates to a valve assembly and, more particularly, to a special sealing arrangement for the valve assembly with a protruding valve seat structure such as those commonly used in water faucets and the like.

Description of the prior art

Heretofore, the sealing arrangements in the well known hot and cold water faucets had the disadvantage that, after opening the valve, especially with hot water, the flow of the water would be restricted gradually in an undesirable manner due to the thermal expansion of the sealing element. Conversely, contraction caused by cooling after the valve has been shut off sometimes leads to dripping. Moreover, quick shutoff of well known valves usually causes water shocks in the piping systems. Sealing arrangements used in this type of prior valves also have the disadvantage that precision regulation of the flow is difficult to attain. Usually, even with a normal opening of the tap, a large volume of flow will commence resulting in an unnecessarily high water consumption. Furthermore, as a result of the aforesaid undesirable restriction of the flow after the valve has been opened and of the lack of precision adjustment of the flow, any desired mixing of hot and cold water to obtain proper water temperature and rate is difficult to obtain and usually requires repeated testing and readjusting.

SUMMARY OF THE INVENTION

I have discovered that the aforesaid disadvantages in a valve can be overcome simply and effectively using the sealing arrangement of this invention which is suitable for use in a valve assembly having a valve body, a valve seat structure disposed on and protruding from the valve body and having on its frontal surface an opening communicating with an inlet passage of a fluid, and a valve unit movable along an axis toward and away from the frontal surface of the seat structure to vary the total rate of discharge of fluid through the opening. The valve unit is positioned opposite the seat structure along the axis and being movable to a position in which the valve unit bears against the seat structure in sealing engagement therewith about the opening and thereby closes off the discharge of the fluid. Broadly stated, the sealing arrangement of this invention comprises a sealing element for the valve unit having a first surface facing the frontal surface of the valve seat structure, and a bead in the form of a projecting rim extending away from the first surface. The bead forms (a) an inner circumferential surface for gripping the outer peripheral surface of the protruding valve seat structure, and (b) an outer circumferential surface free for the expansion of the bead radially away from the outer peripheral surface of the protruding valve seat structure for a distance corresponding to the thermal expansion characteristic of the bead. Preferably, the first surface is in the form of a sealing surface for abutting the frontal surface of the valve seat structure with which the valve unit shuts off the flow of the fluid.

With the provision of the bead in the form of a projecting rim in the sealing element, better sealing and more precise regulation are realized. Moreover, the restriction of flow or leaking due to thermal expansion and contraction of the sealing element during the operation of the valve are eliminated for reasons which will be apparent from the following detailed description of the preferred embodiment with reference to the accompanying single sheet of drawings.

BRIEF DESCRIPTION OF THE DRAWING

FIG. 1 is an elevational view partially in cross section of a valve seat and a first embodiment of the valve unit of the invention prior to assembly.

FIG. 2 is an elevational view partially in cross section of the valve unit of FIG. 1 in its assembled position as it is being used with the valve seat to effect a sealing arrangement.

FIGS. 3, 4, 5, 6 and 7 are elevational views of additional embodiments of the valve unit of the invention in their assembled state.

DESCRIPTION OF THE PREFERRED EMBODIMENT

Figure 6:
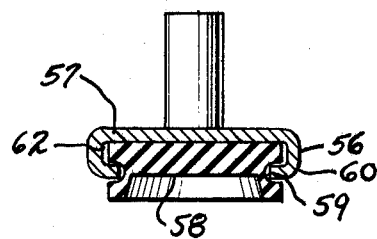

The valve assemblies disclosed in the drawings are the faucet type with a valve body, a delivery spout, and a control handle such as may be used over a sink or a tray. The conventional parts of the faucet are not illustrated therein. It is understood that the valves constructed in accordance with the principles of the invention also could be assembled in a pipe line as customary in shower baths and other household or industrial equipment as will be apparent from the following description.

Referring initially to FIG. 1, the valve unit has a valve disc 11 which may be provided with a valve control element 12 such as a spindle in the form of a cylindrical rod which in turn may be connected to a handle (not shown) for moving the valve disc 11 toward or away from the valve seat structure 13 in a conventional manner such as by rotating the spindle about its central axis. The valve disc 11 as shown has a generally round base with a rim 14 around its periphery and projecting therefrom. This valve disc configuration is designed to receive and for mounting the sealing element 15 which has an integral bead 16 in the form of a projecting rim extending from the sealing surface 17. The sealing element which may be made from conventional resilient waterproof material, such as rubber, also has a general circular configuration with a peripheral groove 18 for receiving the rim 14 of the valve disc 11 in the assembled condition.

For fastening the sealing element 15 to the valve disc 11, a bolt and nut fastener may be used wherein the bolt portion 19 is integrally connected to the center of the circular valve disc. A corresponding opening 20 is provided on the sealing element 15 so as to allow the bolt 19 to pass therethrough. The sealing element 15 is tightly mounted onto the disc 11 by threading the nut 20 to the bolt 19. The nut portion 20 of the fastener advantageously has a polyhexagonal shoulder such as a hexagonal shoulder 26 with internal threads 27 for screwing onto the threaded portion 28 of the bolt 19. The outer surface 29 of the nut 20 preferably is conical shape which is used to diverge the flow of the fluid.

The valve seat structure 13 is generally in a cylindrical form with an opening 21 on its frontal surface 22. The opening 21 communicates with the passage of a fluid such as hot or cold water. The valve seat 13 protrudes outwardly from the main body of the valve 23 and has a smooth outer cylindrical peripheral surface 24. The valve seat 13, as shown, is an integral part of the valve body or it may be a separate part which is screwed onto the valve body. The valve unit 10 is positioned opposite the valve seat 13 along the central axis of the opening 21 and is movable along the central axis in a well-known manner to a position in which the valve unit 10 bears against the valve seat in seating engagement therewith about the opening thereby closing the discharge of the fluid as more clearly shown in FIG. 2. Conversely, in certain valve assemblies, the valve seat can be axially movable while the valve disc 11 is stationary to effect a similar type of sealing arrangement.

The sealing element 15, as shown in FIG. 1, is provided with the annular bead 16 which extends beyond the sealing surface 17 to form an inner circumferential surface 25 which may be beveled to form an angle with the central axis (as shown in FIG. 1) between 0° and 60° and preferably about 15°. The inner circumferential surface 25 of the sealing element 15 thus essentially has the form of a truncated cone. The dimension of the truncated cone is adjusted so the inner circumferential surface 25 will grip the outer peripheral surface 24 of the valve seat 13 when the valve disc 11 is moved to about or at its sealing position as shown in FIG. 2. In the sealing position, the sealing surface 17 is in abutment with the frontal surface 22 of the valve seat 13 and thereby stops the flow of the water. It is important that the outer circumferential surface 25A of the annular bead 16 is not restricted by the rim portion of the valve disc 11 so the bead portion of the sealing element may be expanded or contracted radially for reasons as will be described in greater detail hereinbelow.

Advantageously, the diameter of the sealing surface 17 of the sealing element 15 is slightly smaller than the diameter of the annular frontal surface 22 of the valve seat 13 so that when the sealing surface 17 is in abutment with the frontal surface 22 it causes a slight radial expansion of the bead 16. The truncated cone shape inner circumferential surface 25 of the expanded annular bead 16 tends to grip the cylindrical outer peripheral surface 24 of the valve seat 13 as the valve unit is being axially moved upward thus creating in effect a secondary seal for the valve unit. It is also preferred that the diameter of the base of the sealing element 15 is smaller than the diameter of the valve disc 11 defined by the inner surface of the rim 14 so that in the assembled state an annular space 30 is created therebetween as shown in FIG. 2. The tendency for any shifting or permanent deformation in the radial direction of the sealing element 15, however, is limited by the extending rim 14 of the valve disc 11.

The operation of the sealing arrangement provided by the valve unit 10 of this invention may be explained as follows with further reference to FIG. 2. As shown therein, the valve unit 10 is in a complete sealing arrangement with the valve seat 13. To open the valve, the valve unit 10 is lifted by the upward axial movement of the rod 12 (which may be accomplished in a conventional manner) to create initially a small space between the sealing surface 17 and the frontal surface 22 of the valve seat 13. The water under pressure flows radially outward from the opening 21 forcing a radial expansion of the bead 16 which, at the same time, tends to contract from its initial expanded position. The counteraction creates a slight but incomplete sealing for the valve. Thus, a limited amount of water passes around the annular bead and flows out of the valve housing.

As the valve unit 10 is axially moved further upward, the space between the sealing surface 17 and the frontal surface 22 increases accordingly. The tendency for the inner surface 25 of the expanded bead 16 to grip the outer periphery 24 of the valve seat remains. However, the contracting force of the bead 16 is smaller in comparison with the increasing water pressure; hence, the resultant flow of water is proportionally increased. It is apparent that the provision of an annular bead 16 reduces the tendency for the flow of water to increase in a sudden burst as experienced by prior sealing arrangements and, at the same time, makes it possible to regulate the flow of the water proportional to the axial displacement of the valve unit 10. In other words, it is possible to provide fine adjustment of the flow of water by a relatively large axial displacement of the spindle 12.

When shutting off the valve, the throttling of the passing quantity of water is likewise brought about gradually which has the advantage of eliminating water shock in the pipe system.

It is interesting to note that the provision of the annular bead in effect increases the total sealing surface for a given size of valve seat surface. The essential advantage of the valve unit of this invention, however, is in the capability of the unit to eliminate completely the undesirable gradual restriction of the flow after the valve is opened and the dripping of the faucet after the valve is shut off. Gradual restriction of the flow as well as dripping are caused by thermal expansion and contraction effected particularly by the flow of hot water. During operation, the hot water heats the sealing element to cause it to expand axially so that the space between the sealing surface and the valve seat is decreased which in turn restricts or throttles the flow of the water. Conversely, when the valve is shut off, the cooling effect gradually causes the sealing element to contract so the sealing pressure exerted thereon is lessened oftentimes to such as extent as to cause dripping.

These troublesome properties of the usual valves are avoided with the valve unit of this invention because the thermal expansion of the sealing element causes not only axial expansion but even more in the radial direction. Hence, the axial expansion which tends to reduce the space between the sealing surface 17 and the frontal surface 22 of the seat 13 is compensated for by the radial expansion of the annular bead 16 which creates less of a sealing effect. The same thing is true for cooling wherein the axial contraction of the sealing element is compensated for by the radial contraction the latter of which presses the inner surface 25 more tightly against the periphery of the valve seat 13 so that dripping, even with just a slightly closed valve, will not occur. It will be appreciated that the configuration of the valve unit 10 is such that the radial expansion of the annular bead 16 is free and substantially unobstructed.

The above description illustrates that the sealing arrangement based on the present invention is capable of providing steadier and more precise control of the flow and is more adaptable for use for finer temperature adjustment than the aforesaid prior sealing arrangements. Moreover, the valve assembly, using the sealing arrangement according to this invention, requires far less pressure to shut off the valve than heretofore especially when the sealing element had been deformed after prolonged use.

The desired sealing effect with the valve unit 10 of this invention can be obtained with sealing elements whose inner surface of the annular bead portion 16 is preferably beveled so that the angle of inclination α (see FIG. 1) is less than about 60°. In the extreme cases, the inner circumferential surface 25 of the bead may be in the form of a truncated cone with the angle of inclination approaching or at 60° or it may be in the form of a cylinder.

Since the protruded valve seat structure 13 can be found in a number of prior art valve assemblies, it is apparent that the valve unit 10 of this invention can be served as a replacement part of those valves to obtain the advantages described. The dimension of the sealing element and other dimensions, however, should be selected and adjusted to each other to provide the optimal results.

FIG. 3 shows a second embodiment of the valve unit 31 similar to the valve unit 10 shown in FIGS. 1 and 2. In this embodiment the outer groove of the round sealing element is eliminated so the resultant sealing element 32 has a substantially cylindrical outer surface 33. The valve disc 34 used has a diameter sufficiently large so that an annular space is created between the inner surface of the projecting rim 35 and the outer surface 33 of the sealing element. The annular bead portion 36 of the sealing element preferably also has an inclined inner circumferential surface 37 for gripping the outer periphery of a protruded valve seat.

Figure 7:
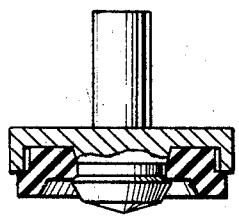

As shown in FIG. 3, the sealing element 32 is mounted onto the valve disc 34 by a bolt and nut fastener 38 similar to the first embodiment described. It is understood that other forms of fasteners can also be used. For example, the nut portion of the fastener 38 may be a conventional flat polygonal nut. The nut shown which has an outer conical shape, however, is preferred because it directs the flow of the water through the opening of the valve seat in a radial direction into the direct proximity of the sealing surface which brings about an improvement of the flow condition. Instead of a nut, a conventional clamping cap or a clamping ring may be used to fasten the sealing element onto the valve disc by clamping the cap or the ring onto the bolt portion of the fastener 38. The threads of the bolt may be replaced with a notch for receiving the clamping element of the cap or the ring. It is also possible to secure the sealing element onto the valve disc by riveting or other known methods for fastening. The fastener 38 as shown in FIG. 3 may be an integral unit. In such case the resilient sealing element 32 with a central aperture may be secured on and retained to the valve disc 34 by pushing through the head of the fastener such as shown in FIG. 7.

In some other forms of securing the sealing element onto the valve disc, the central fastener as described may be completely dispensed of. In such instances the projecting rim for the valve disc may be used advantageously for securing the sealing element thereon. For example, the rim may be slightly tapered so that it can be used to frictionally hold onto the sealing element, or a mounting ring is used to secure the sealing element onto the rim, both of which are provided with an annular groove for the retention of the mounting ring.

Further to illustrate the concept of using the rim portion of the valve disc for securing the sealing element thereon, special embodiments are illustrated in FIGS. 4 and 6 wherein the rim portions 39 and 56 are integral parts of the valve discs 40 and 57 respectively. In the arrangement shown in FIG. 4, the rim portion 39 extends downwardly for a distance equivalent to the thickness of the sealing element 41 including the annular bead portion. An integral annular flange 42 is provided on the extreme of the rim for retaining the sealing element therein. The diameter of the valve disc 40 is greater than the diameter of the circular sealing element 41 to an extent that an annular space 43 is provided therebetween. The annular space 43 should be sufficiently large so that the outer circumferential surface 44 is free to expand radially for a distance corresponding to the thermal expansion characteristic of the sealing element during the service of the valve assembly.

In the arrangement shown in FIG. 6, the rim portion 56 extends downwardly to about one half the thickness of the sealing element 58 to above about the outer periphery of the bead portion 59 of the sealing element. A flange 60 is used to protrude into the annular groove 61 provided on the sealing element 58 thereby retaining the sealing element to the valve disc 57. This construction provides a fastening arrangement wherein the annular bead portion 59 is completely free to move radially in the aforesaid manner under the pressure and the heat of the water when the valve is being opened.

It may be advantageous to manufacture the valve unit in which the bead portion is a separate component of the sealing element using different types of materials for each part. Thus it is preferred to use a relatively resilient material for the bead portion and a relatively harder material for the sealing element which provides the main sealing surface for the valve seat. These types of valve units are illustrated in FIGS. 5 and 8.

Referring now to FIG. 5 the valve unit 45 has a generally circular valve disc 46 connected to a spindle 47 for axially moving the valve disc toward and away from the valve seat. The valve disc 46 preferably is manufactured from a soft metal or a relatively hard plastic so that it can serve simultaneously as a sealing element to provide a sealing surface 48. Adjacent to the periphery of the valve disc 46 is an annular groove 49 for receiving an annular ring which serves as the bead portion 50 for the valve disc 46. As shown the bead portion 50 has an inner circumferential surface which is beveled in a manner as described hereinabove and an outer circumferential surface which is free to allow the bead portion 50 to expand radially. Preferably the bead portion 50 is molded onto the valve disc 46 by the deformation of the groove such as by clamping.

Figure 8:
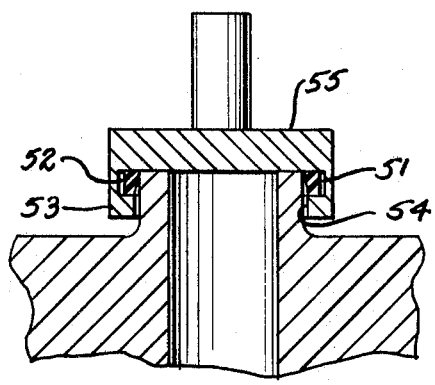
FIG. 8 is an elevational view partially in cross section of still another embodiment of the valve unit of the invention in its assembled position as it is being used with the valve seat to effect a sealing arrangement.

Alternatively, the bead portion may be in the form of a sealing ring 51 with a cylindrical outer surface 52 and a conical inner circumferential surface 53 as shown in FIG. 8. The sealing ring 51 is positioned within an annular groove 54 on a bell-shaped circular disc 55. It is important that the radial clearance within the groove be sufficient for the expansion of the sealing ring 51. Instead of the sealing ring 51 as described, an O-ring can be used in its place.

In the embodiments as shown in FIGS. 4, 5, and 8, a conical element protruding away from the center of the sealing surface may be provided to direct the flow of water in a desirable manner. It is also possible in all the preferred embodiments that the bead portion is so dimensioned as to provide a complete seal for the valve.

In the specific examples described, the outer surface of the bead portion is completely free so that it can expand radially without obstruction. It is understood that such requirement is not mandatory as long as the material confining the bead portion also has similar thermal expansion characteristics such as those of plastics. Various modifications can be made using this type of material for the construction of the valve unit in accordance with the teachings of this invention. For example, the sealing element with an integral annular bead portion may be encased in a bell-shaped valve disc. With rising temperature during service, the valve disc as well as the sealing element will expand radially to the same extent. In effect, the free expansion of the sealing element, particularly the bead portion of it, is not obstructed. In such cases, no radial clearance (the annular spaces 43 and 52 in FIGS. 4 and 8 respectively) is needed.

I claim:

1. In a valve assembly having a valve body, a valve seat structure disposed on and protruding from the valve body having circular frontal and cylindrical walled outer surfaces, said frontal surface having an outer diameter at the conjunction of said frontal and outer surfaces and defining an opening communicating with an inlet passage of a fluid, a valve unit movable along an axis toward and away from the frontal surface of the seat structure to vary the total rate of discharge of said fluid through the opening, said valve unit being positioned opposite said seat structure along said axis and being movable to a position in which the valve unit bears against said structure in seating engagement therewith about the opening and thereby closes off the discharge of said fluid, the improvement in combination therewith comprising an annular sealing element for said valve unit having a first sealing surface facing said frontal surface of the valve seat structure, and a circumferential bead extending from the first sealing surface in an axial direction toward said seat structure, the internal portion of said bead which faces said cylindrical walled outer surface of the valve seat structure being disposed angularly away from said outer surface and having at least one internal diameter less than the outer diameter of said valve seat structure, said bead being deformed radially throughout a substantial axial travel toward and away from said valve seat structure for gripping and sealing against said valve seat structure, said bead being unsupported about the entire periphery thereof to allow unrestricted thermal expansion of said bead radially away from the outer surface of the protruding valve structure for a distance to compensate for the thermal expansion characteristic of said bead in an axial direction toward said valve seat structure.

2. In a valve assembly according to claim 1 wherein (a) the valve unit has a valve disc capable of receiving the sealing element and the bead and for mounting them thereon, (b) the valve disc comprises a circular base having a rim projecting away from one of its surfaces, (c) the sealing element and the bead are an integral unit of a resilient material with a circular base, and (d) there are fastening means for mounting the integral unit of the sealing element and the bead onto said valve disc with the bead spaced apart from the rim of said disc thereby allowing it free to expand radially.

3. In a valve assembly according to claim 2 wherein the circular base of the resilient material which forms the integral unit of the sealing element and the bead has a central opening thereon and the fastening means for mounting said integral unit has a bolt portion mounted on the center of the valve disc and passing through the center opening of the integral unit.

4. In a valve assembly according to claim 3 wherein the outermost portion of the fastening means has a substantially cone shaped outer surface for diverting the flow of said fluid.

5. In a valve assembly according to claim 4 wherein the circular base of the integral unit has a peripheral groove for accepting the projecting rim of the valve disc.

6. In a valve assembly according to claim 5 wherein the inner surface of the bead portion of the integral unit is beveled.

7. A unit valve assembly according to claim 2 wherein said valve disc has a rim which entirely encompasses the circumferential outer periphery of said bead, said rim and bead defining a gap therebetween.

References Cited

UNITED STATES PATENTS

| | | | |
|---|---|---|---|
| 2,205,533 | 6/1940 | Langdon. | |
| 2,592,673 | 4/1952 | Folmsbee. | |
| 1,281,791 | 10/1918 | Klug | 251—210 X |
| 1,365,449 | 1/1921 | Blair | 251—333 X |
| 1,750,462 | 3/1930 | Cornelius | 251—333 |
| 2,569,471 | 10/1951 | Harding | 251—333 X |
| 2,920,862 | 1/1960 | Beard | 251—357 |
| 3,168,283 | 2/1965 | Gamble | 251—333 |
| 2,273,693 | 2/1942 | Burks. | |
| 2,976,010 | 3/1961 | Huthsing | 251—358 X |
| 3,307,633 | 3/1967 | Newall | 251—175 X |

FOREIGN PATENTS

| | | |
|---|---|---|
| 84,493 | 10/1935 | Sweden. |
| 399,510 | 10/1933 | Great Britain. |
| 885,836 | 1961 | Great Britain. |

ARNOLD ROSENTHAL, Primary Examiner

U.S. Cl. X.R.

251—357